United States Patent

Tawaratani

[19]

[11] Patent Number: 5,373,415
[45] Date of Patent: Dec. 13, 1994

[54] GAS FILLED POWER SWITCHING APPARATUS HAVING A VERTICAL TYPE CIRCUIT BREAKER

[75] Inventor: Takeo Tawaratani, Amagasaki, Japan

[73] Assignee: Mitsubishi Denki Kabushiki Kaisha, Tokyo, Japan

[21] Appl. No.: 95,991

[22] Filed: Jul. 23, 1993

[30] Foreign Application Priority Data

Aug. 6, 1992 [JP] Japan .................. 4-209941

[51] Int. Cl.[5] .............................. H02B 5/00
[52] U.S. Cl. ...................... 361/612; 200/148 R; 361/618
[58] Field of Search ............. 200/145, 148 R, 148 B, 200/148 D, 48 R; 307/42, 83, 147, 148; 361/605, 611, 612, 618-621, 673

[56] References Cited

U.S. PATENT DOCUMENTS 4,829,400  5/1989  Enomoto .
4,862,319  8/1989  Suzuyama .................. 361/341

FOREIGN PATENT DOCUMENTS 61-66511  4/1986  Japan .

OTHER PUBLICATIONS

Mitsubishi Electric Advance, Dec. 1978, pp. 101-103, Tadashi Kishimoto, "New Three-Phase-Enclosure GISs".

*Primary Examiner*—Gerald P. Tolin
*Attorney, Agent, or Firm*—Oblon, Spivak, McClelland, Maier & Neustadt

[57] ABSTRACT

Three serially-connected units (19, 20, 21) of a one and half busbar type gas insulated switchgear are disposed parallely, wherein each unit includes: a vertical-type circuit breaker (16) having an upper connection (16a) and a lower connection (16b). To each connection a series connection of a horizontally-extending current transformer (4a, 4b) and a disconnecting switch (2a, 2b) are connected; and oblique connecting busbars (17, 18) each diagonally bridges a disconnecting switch (2a) in the upper disposed series connection to a disconnecting switch (2b) in the lower disposed series connection in the adjacent unit.

4 Claims, 10 Drawing Sheets

GAS FILLED POWER SWITCHING APPARATUS HAVING A VERTICAL TYPE CIRCUIT BREAKER

FIELD OF THE INVENTION AND RELATED ART STATEMENT

1. Field of the Invention

The present invention relates to a gas insulated switchgear which comprises an enclosure filled with a gas such as sulfur hexafluoride ($SF_6$), and in particular, it is concerned with a manner of arranging the various parts and components constituting such gas insulated switchgears.

2. Description of the Prior Art

One example of the conventional gas insulated switchgear is shown in FIGS. 7, 8, 9, 10 and 11 of the attached drawings. In these Figures, FIG. 7 is a one line diagram of a one and half bus arrangement, FIG. 8 is a plan view for illustrating the arrangement of the respective parts and components included in the circuit shown in FIG. 7, FIG. 9 is a partial cross-sectional view along a plane including the lines IX—IX of FIG. 8, FIG. 10 is a partial cross-sectional view along a plane including the lines X—X of FIG. 8, and FIG. 11 is a partial cross-sectional view along a plane including the lines XI—XI of FIG. 8.

In FIG. 7 through FIG. 11, a first unit 11, a second unit 12, and a third unit 13 are generally connected in series between a left upper main busbar 1 and a right lower main busbar 10.

The first unit 11 comprises a first vertical type circuit breaker 5, which has a first connection 5a at the upper part thereof and a second connection 5b at the lower part thereof, as specifically shown in FIGS. 8 and 9. Both the connections 5a and 5b are directed in the horizontal direction but opposite to each other with respect to the vertical type circuit breaker 5. The first connection 5a is connected, through a series combination of a current transformer 4a and a disconnecting switch 2a, to the left upper main busbar 1 installed above the disconnecting switch 2a. On the other hand, the second connection 5b is connected, through a series combination of a current transformer 4b, a disconnecting switch 2b, and a disconnecting switch 2, to one end of a right upper connecting busbar 7 installed above the disconnecting switch 2. The disconnecting switch 2 is further connected to a cable junction box 6 composed lateral to the disconnecting switch 2.

The second unit 12 comprises a second vertical type circuit breaker 5 which has a first connection 5a at the upper part thereof and a second connection 5b at the lower part thereof, as specifically shown in FIGS. 8 and 10. Both the connections 5a and 5b are directed in the horizontal direction but opposite to each other with respect to the vertical type circuit breaker 5. The first connection 5a is connected, through a series combination of a current transformer 4a, a disconnecting switch 2a and another disconnecting switch 2 installed beneath the disconnecting switch 2a, to one end of a left lower connecting busbar 9 provided below the disconnecting switch 2. The disconnecting switch 2 is further connected to a cable junction box 6 composed lateral to the disconnecting switch 2. On the other hand, the second connection 5b is connected, through a series combination of a current transformer 4b, a disconnecting switch 2b and another disconnecting switch 2, to the other end of the right upper connecting busbar 7 provided above the disconnecting switch 2. The disconnecting switch 2 is further connected to a voltage transformer 8, which is composed lateral to the disconnecting switch 2.

The third unit 13 comprises a third vertical type circuit breaker 5 which has a first connection 5a at the upper part thereof and a second connection 5b at the lower part thereof, as specifically shown in FIGS. 8 and 11. Both the connections 5a and 5b are directed in the horizontal direction but opposite to each other with respect to the vertical type circuit breaker 5. The first connection 5a is connected, through a series combination of a current transformer 4a and a disconnecting switch 2a, to the other end of the left lower connecting busbar 9 provided below the disconnecting switch 2a and to another voltage transformer 8. The second connection 5b is connected, through a series combination of a current transformer 4b and a disconnecting switch 2b, to the right lower main busbar 10 provided below the disconnecting switch 2a for intersecting the latter. In these Figures, each numeral 3 designates grounding switch.

The first, second and third units 11, 12 and 13 configured as described in the above are parallelly installed in a manner that the three circuit breakers 5 are adjacent to one another. The first unit 11 is connected to the second unit 12 through the right upper connecting busbar 7, while the second unit 12 is connected to the third unit 13 through the left lower connecting busbar 9. The first through third units 11–13 constitute one group and a plurality of such groups are arranged in parallel. Each of the groups is connected to the left upper main busbar 1 through the disconnecting switch 2a in each of the first unit 11 and is connected to the right lower main busbar 10 through the disconnecting switch 2b in each of the third unit 13.

The above-mentioned conventional gas insulated switchgears have a problem that they cannot arrange the respective parts and components concentrically, that an inspection spaces of the circuit breakers 5 are limited narrow, and that it is difficult to realize the standardization of the respective parts and components. The reason for this in the conventional gas insulated switchgear configured as mentioned above is that, the series combinations of the current transformers 4a and 4b and the disconnecting switches 2a and 2b are horizontally extended on both sides of the circuit breakers 5 in each of the units. And further that the one of the units is connected to the other units at the disconnecting switches 2a and 2a or 2b and 2b horizontally extended on both side of the circuit breakers 5, and to the main busbars at the disconnecting switches 2a and 2b.

OBJECTS AND SUMMARY OF THE INVENTION

The present invention has been made in order to solve the above-mentioned problem and has, as its object, the provision of a gas insulated switchgear that can make the space for the inspection of the circuit breakers side and can realize the standardization of the respective parts and components.

In accordance with the present invention, there is provided a gas insulated switchgear comprising:
 a plurality of parallelly-disposed and serially-connected units each of which includes;
 a vertical-type circuit breaker, which has a first connection directed in the horizontal direction and provided at the upper part of the circuit breaker, and a second connection directed in the same direction as the first connection and provided at the lower part of the circuit breaker; and a pair of series combinations of current transformers and disconnecting switches, each of which combinations is coupled to one of the connections of the circuit breaker and extends horizontally and parallely with each other; and a plurality of connecting busbars, each of which bridges one of the disconnecting switches in the pair connected to the upper part of the circuit breaker in one of the units, with one of the disconnecting switches in the pair connected to the lower part of the other circuit breaker in the adjacent unit, thereby connecting both the circuit breakers together, wherein;

each of the disconnecting switches in the outermost pairs in the serially-connected units is connected to one of main busbars.

In the above-mentioned gas insulated switchgear, each of the connecting busbar may be diagonally bridging the adjacent units for coupling one of the disconnecting switches at the upper part in one unit, to one of the disconnecting switches at the lower part in the other unit.

The above-mentioned gas insulated switchgear, may further comprises;

another plurality of disconnecting switches each of which is coupled to the disconnecting switch in one of the combination of one of the units, and to one of cable junction boxes.

The above-mentioned gas insulated switchgear, may further comprises;

a plurality of voltage transformers connected to a junction of two disconnecting switches.

In the gas insulated switchgear provided in accordance with the present invention, the respective parts and components can be disposed concentrically by vertically providing the connections of the respective circuit breakers and by directing both the connections to the same horizontal direction. The gas insulated switchgear of the present invention has an advantage in that it can make the space for the inspection of the circuit breakers wide by arranging the respective parts and components concentrically, and in that it is possible to realize the standardization for the respective parts and components.

While the novel features of the present invention are set fourth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DETAILED DESCRIPTION OF THE PREFERRED EMBODIMENTS

In the following paragraphs, the present invention will be described in more detail by way of examples with reference to the preferred embodiments shown in the attached drawings.

Figure 1:
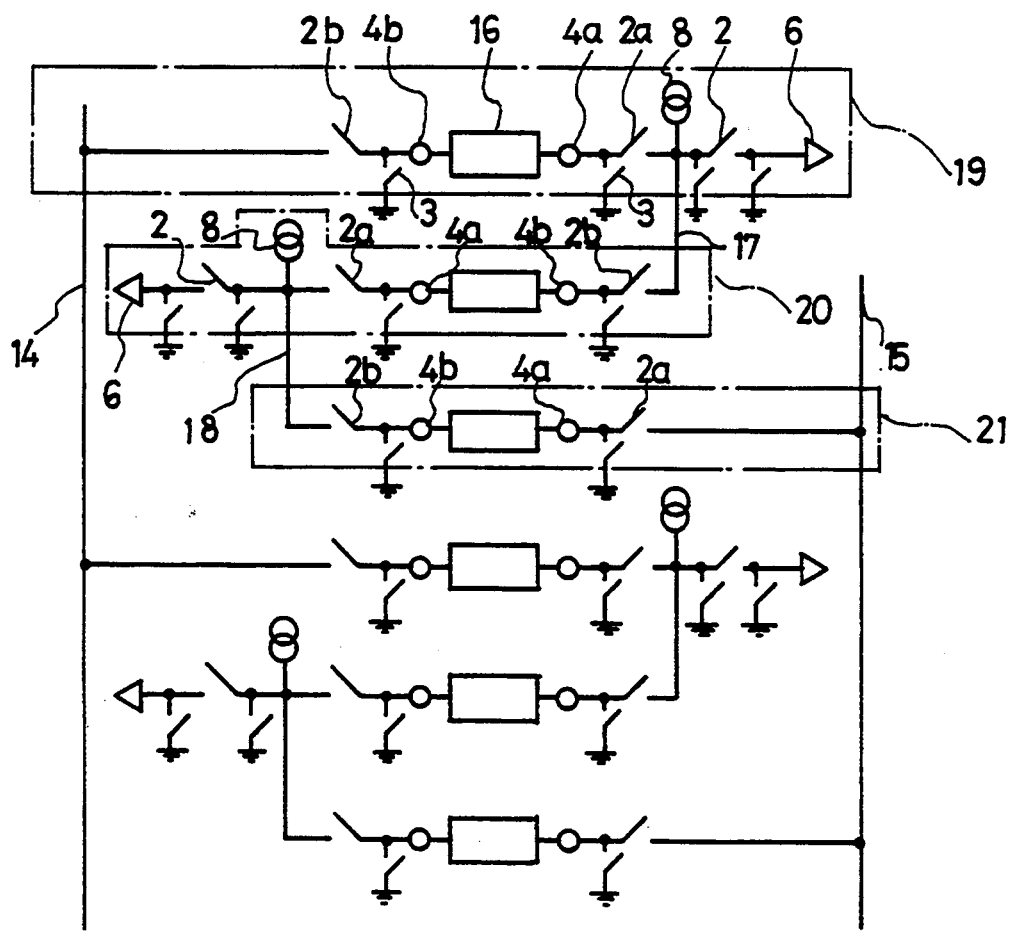
FIG. 1 is a one-line diagram showing a one and half busbar arrangement of a gas insulated switchgear built in accordance with an embodiment of the present invention.
Figure 2:
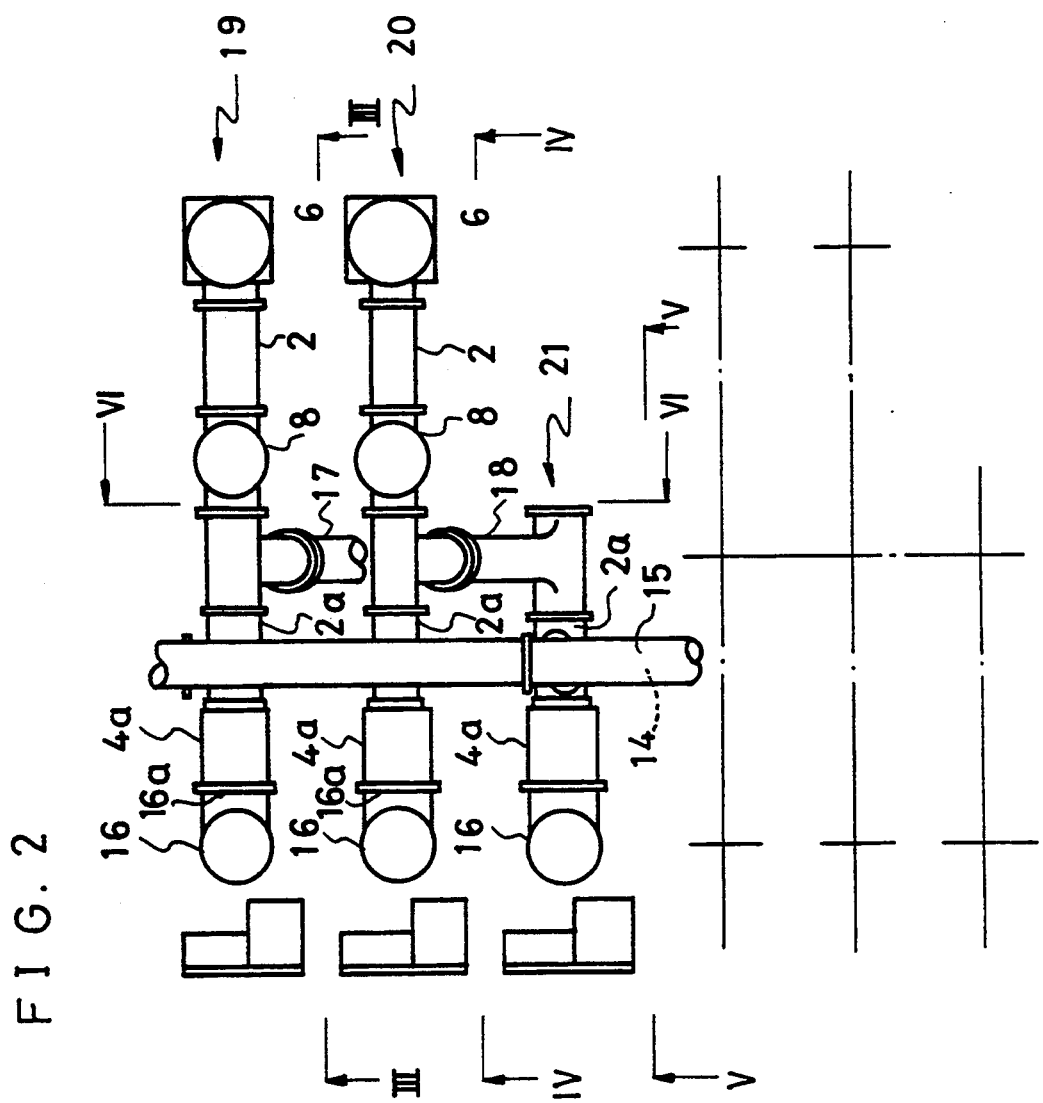
FIG. 2 is a plan view for illustrating the arrangement of the respective parts and components included in the gas insulated switchgear shown in FIG. 1.
Figure 3:
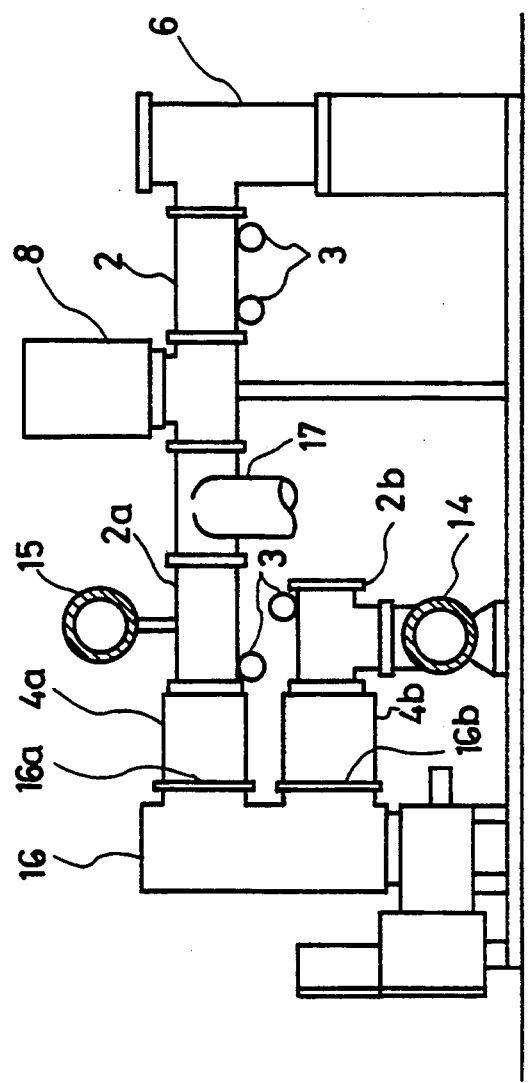
FIG. 3 is a cross-sectional view along a plane including the lines III—III of FIG. 2 for illustrating a first unit in the gas insulated switchgear.
Figure 4:
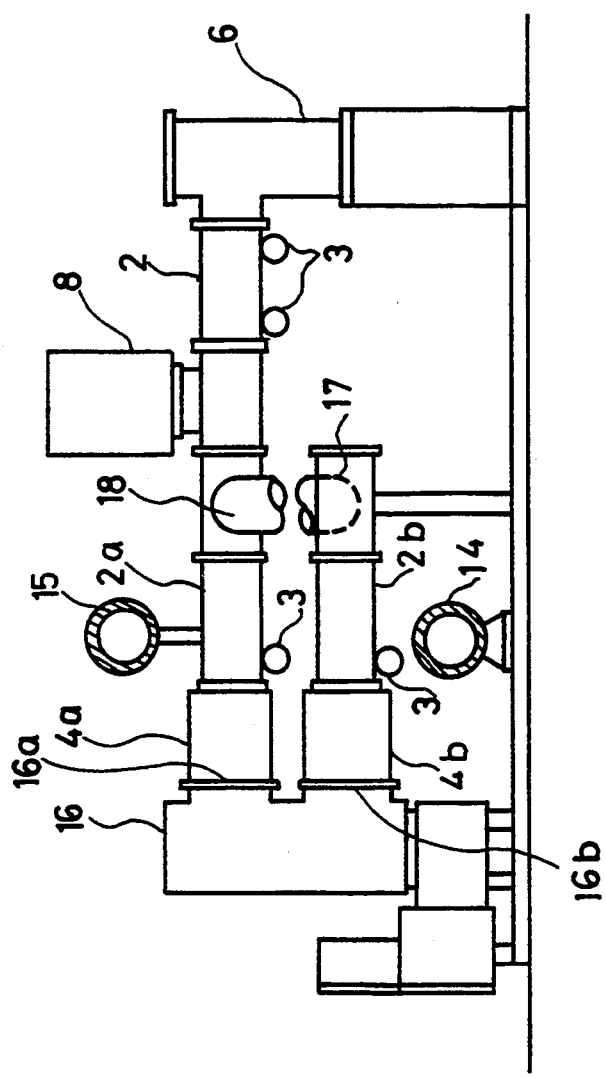
FIG. 4 is a cross-sectional view along a plane including the lines IV—IV of FIG. 2 for illustrating a second unit in the gas insulated switchgear.
Figure 5:
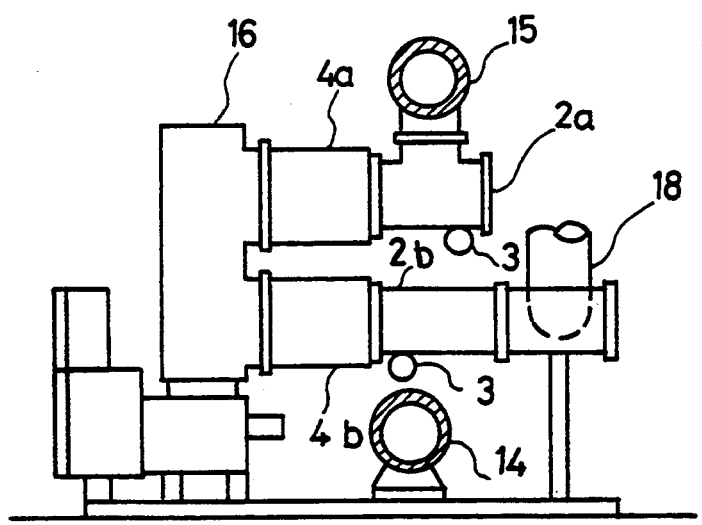
FIG. 5 is a cross-sectional view along a plane including the lines V—V of FIG. 2 for illustrating a third unit in the gas insulated switchgear.
Figure 6:
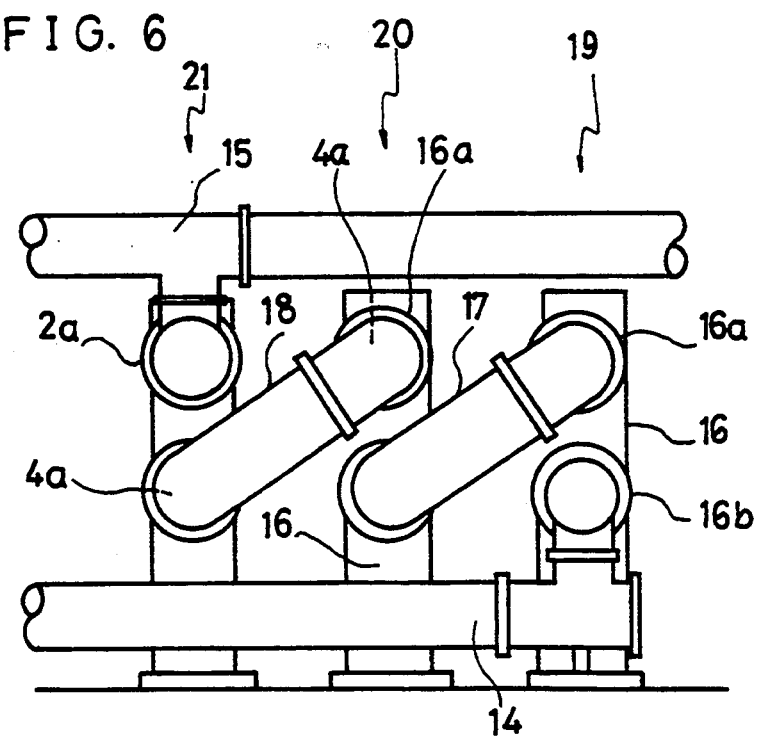
FIG. 6 is a cross-sectional view along a plane including the line VI—VI of FIG. 2 for illustrating connections between the main busbars and the respective units, as well as those between the connecting busbars and the respective units in the gas insulated switchgear.
Figure 7:
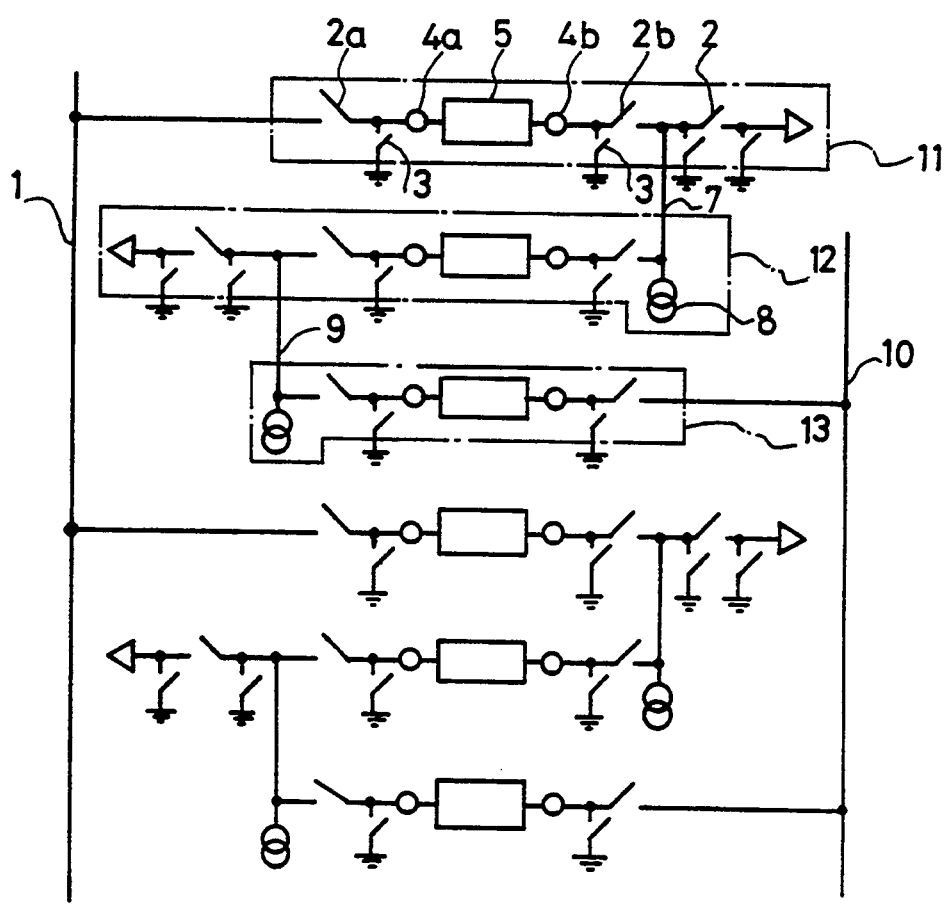
FIG. 7 is a one-line diagram of a one and half busbar arrangement of the prior art gas insulated switchgear.
Figure 8:
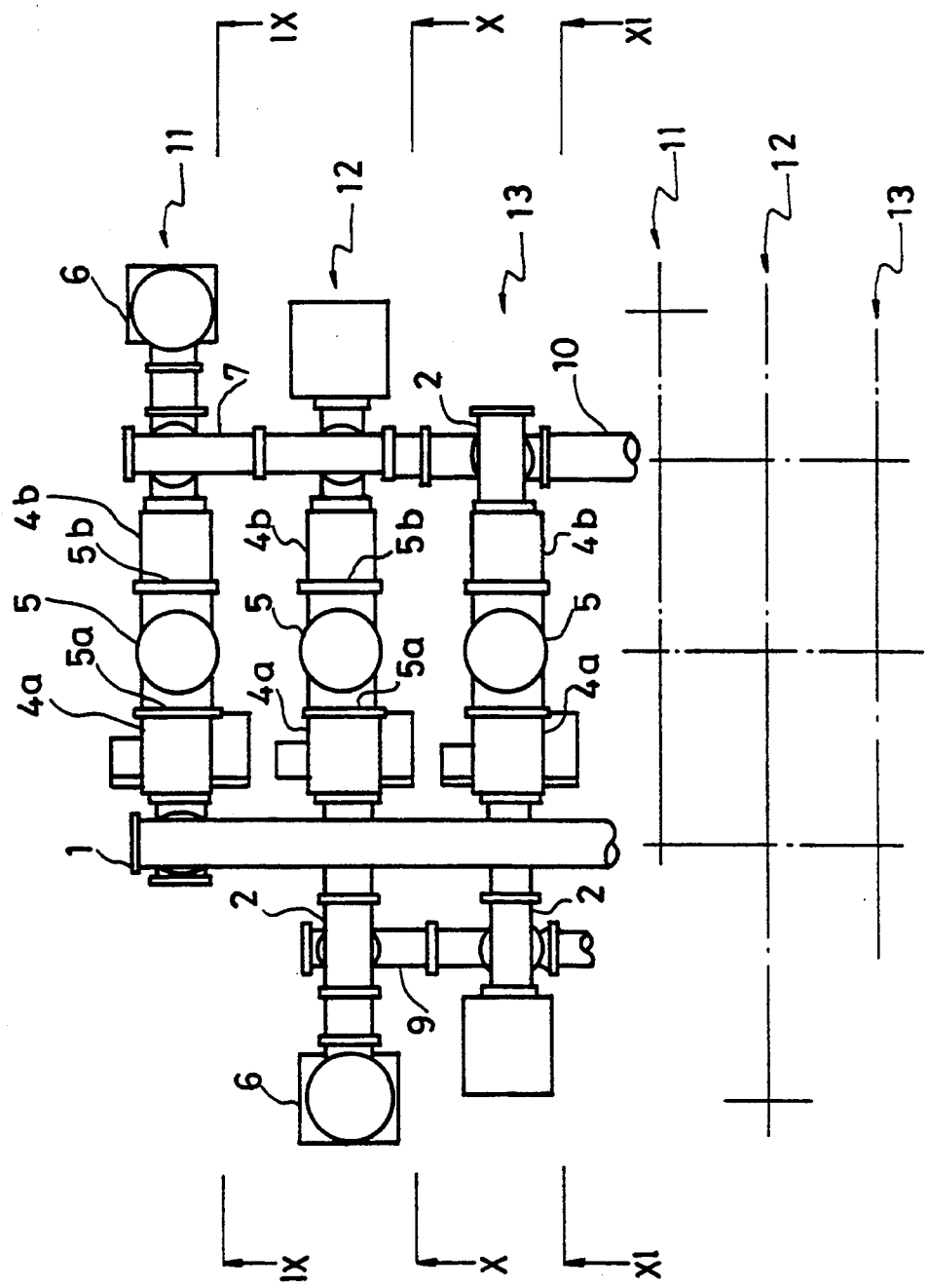
FIG. 8 is a plan view for illustrating the arrangement of the respective parts and components included in the prior art gas insulated switchgear shown in FIG. 7.
Figure 9:
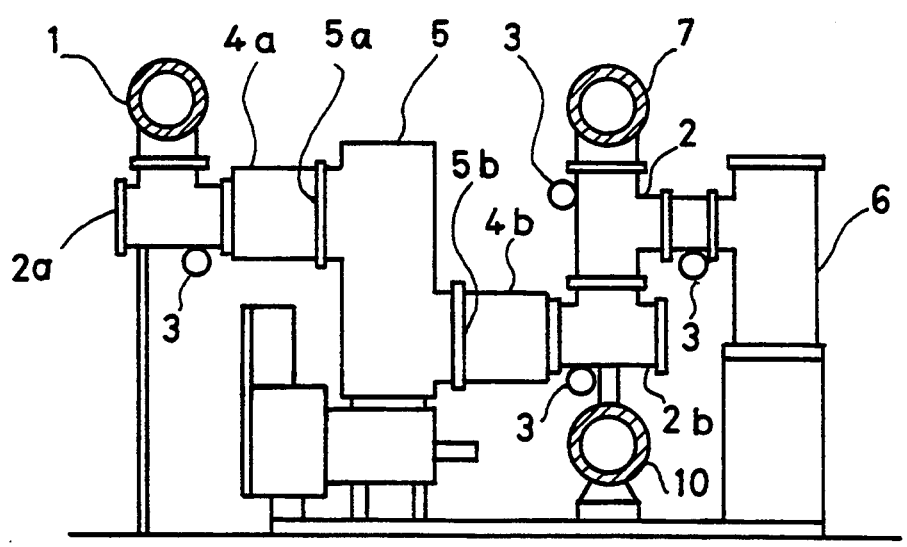
FIG. 9 is a cross-sectional view along a plane including the lines IX—IX of the plan view of FIG. 8 showing the first unit in the prior art gas insulated switchgear.
Figure 10:
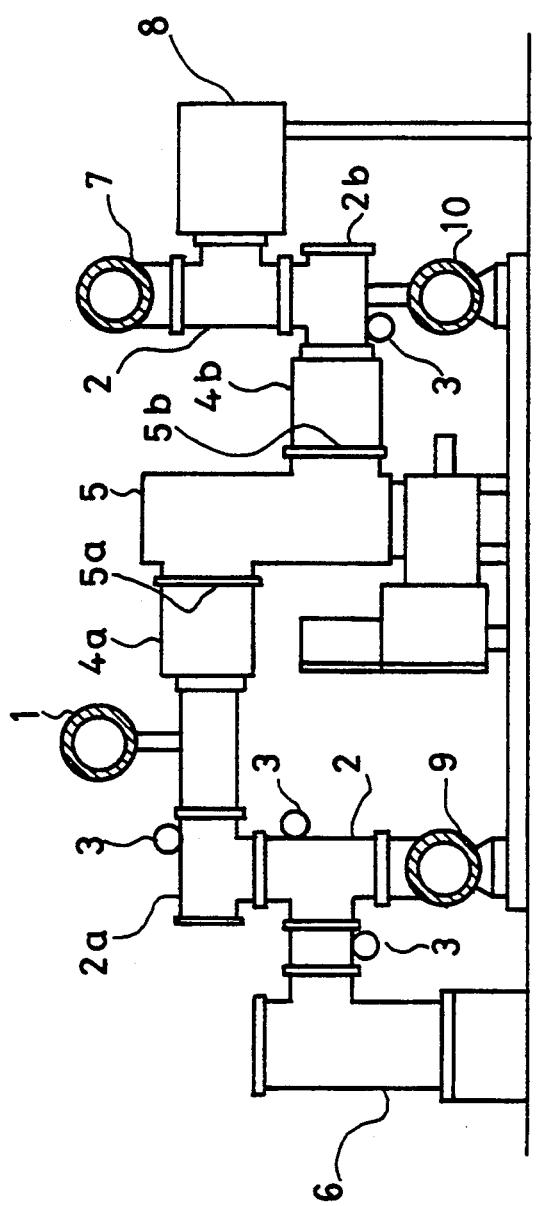
FIG. 10 is a cross-sectional view along a plane including the lines X—X of the plan view of FIG. 8 showing the second unit in the prior art gas insulated switchgear.
Figure 11:
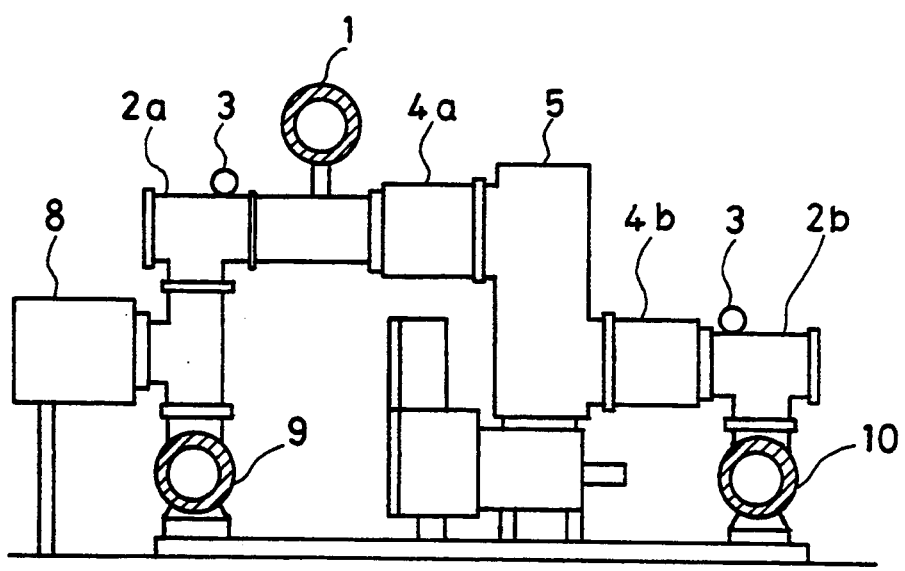
FIG. 11 is a cross-sectional view along a plane including the lines XI—XI of the plan view of FIG. 8 showing the third unit in the prior art gas insulated switchgear.

FIG. 1 is a one-line diagram showing a one and half bus arrangement of an embodiment of the present invention. FIG. 2 is a plan view for illustrating the arrangement of the respective parts and components included in the switchgear shown in FIG. 1. FIG. 3 is a cross-sectional view along a plane including the lines III—III of FIG. 2. FIG. 4 is a cross-sectional view along a plane including the lines IV—IV of FIG. 2. FIG. 5 is a cross-sectional view along a plane including the lines V—V of FIG. 2. FIG. 6 is a cross-sectional view along a plane including the line VI—VI of FIG. 2.

In these Figures, the parts and components which are identical with those in the prior art switchgear are identified with the same reference numerals.

In FIG. 1 through FIG. 6, a first unit 19, a second unit 20 (shown in FIG. 2), and a third unit 21 are generally connected in series between a lower main busbar 4 and an upper main busbar 15.

The first unit 19 comprises a first vertical type circuit breaker 16 configured in a manner that its axial line is perpendicular, which has a connection 16a at the upper part thereof and a second connection 16b at the lower part thereof, as specifically shown in FIGS. 3, 4 and 5. Both the connections 16a and 16b are directed in the same horizontal direction with respect to the vertical type circuit breaker 16, namely in parallel with each other. The first connection 16a is connected, through a series combination of a current transformer 4a and a disconnecting switch 2a, to one end of a right inclined connecting busbar 17 provided lateral to and diagonally opposite to the disconnecting switch 2a. It is to be noted here that the right inclined connecting busbar 17 extends obliquely downward (diagonally) and reaches the disconnecting switch 2b in the second unit 20 as specifically illustrated by FIG. 6. This is similarly applicable to the left inclined connecting busbar 18 which connects the second unit 20 and the third unit 21. The disconnecting switch 2a, to which the right inclined connecting busbar 17 is coupled, is further connected to a voltage transformer 8, a disconnecting switch 2 and a cable junction box 6 in this sequence which are extended horizontally. On the other hand, the second connection 16b is connected, through a series combination of a current transformer 4b and a disconnecting switch 2b, to the main busbar A 14 provided below and intersecting with the disconnecting switch 2b.

The second unit 20 (of FIG. 2), which is the second or middle unit comprises a second vertical type circuit breaker 16 which has a first connection 16a at the upper part thereof and a second connection 16b at the lower part thereof, as specifically shown in FIGS. 2, 4 and 6. Both the connections 16a and 16b are directed in the same horizontal direction with respect to the vertical type circuit breaker 16. In the second unit 20, as shown by FIGS. 2, 4 and 6, the first (or upper) connection 16a is connected, through a series connection of an upper current transformer 4a and an upper disconnecting switch 2a, to one (the upper) end of the left inclined connecting busbar 18 provided laterally to the disconnecting switch 2a. To the upper disconnecting switch 2a is further connected a voltage transformer 8, a disconnecting switch 2 and a cable junction box 6 in this sequence, in a manner extending horizontally from the upper disconnecting switch 2a. On the other hand, the second (or lower) connection 16b is connected, through a series combination of a lower current transformer 4b and a lower disconnecting switch 2b, to the lower end of the right inclined connecting busbar 17 composed lateral to and diagonally to the lower disconnecting switch 2b.

The third or front side unit 21 comprises a third vertical type circuit breaker 16 which has a first connection 16a at the upper part thereof and a second connection 16b at the lower part thereof, as specifically shown in FIGS. 2, 5 and 6. Both the connections 16a and 16b are directed in the same horizontal direction with respect to the vertical type circuit breaker 16. In this third unit 21, the first connection 16a is connected, through a series connection of an upper current transformer 4a and an upper disconnecting switch 2a, to the upper main busbar 15 provided above the disconnecting switch 2a. On the other hand, the second (or lower) connection 16b is connected, through a series combination of a lower current transformer 4b and a disconnecting switch 2b, to the lower end of the left inclined connecting busbar 18 provided lateral and diagonally to the disconnecting switch 2a. In these Figures, each of numerals 3 designates each of grounding switches.

The above-mentioned first, second and third units 19, 20 and 21 configured as elucidated above are arranged in a manner that the three circuit breakers 16 of respective units are arranged adjacent to one another. The first unit 19 is connected to the second unit 20 through the right inclined connecting busbar 17, while the second unit 20 is connected to the third unit 21 through the left inclined connecting busbar 18.

The first through third units 19, 20 and 21 constitute one group; and a plurality of such groups are arranged in parallel. And each of the groups is connected to the main busbars 14 and 15, respectively. That is, the first unit 19 is connected to the lower main busbar 14 through the disconnecting switch 2b in each of the first unit 19 and the third unit 21 is connected to the upper main busbar 15 through the disconnecting switch 2a in each of the third unit 21.

Although the present invention has been described in terms of the presently preferred embodiments, it is to be understood that such disclosures is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A gas insulated switchgear comprising:
   a plurality of parallely-disposed and electrically and physically serially-connected container units each including:
   a vertical-type circuit breaker, which has a first connection directed in the horizontal direction and disposed at the upper part of said circuit breaker, and a second connection directed in the same direction as the first connection and disposed at the lower part of said circuit breaker; and
   a pair of series combinations inside said container units each having a current transformer and disconnecting switch, each being coupled to one of said connections of the circuit breaker and wherein said current transformer and disconnecting switch extend horizontally and parallely with each other; and
   a plurality of connecting busbars connecting said container units, each of which bridges one of said disconnecting switches in said pair connected to the upper part of the circuit breaker in one of said units, with one of said disconnecting switches in said pair connected to the lower part of the other circuit breaker in the adjacent unit, thereby connecting both the circuit breakers together,
   each of said disconnecting switches in the outermost pairs in the serially-connected units being connected to one of plural main busbars of the switchgear.

2. A gas insulated switchgear in accordance with claim 1, wherein;
   each said connecting busbar is diagonally bridging the adjacent units for coupling one of the disconnecting switches at the upper part in one unit, to one of the disconnecting switches at the lower part in the other unit.

3. A gas insulated switchgear in accordance with claims 1 or 2, further comprising;
   another plurality of disconnecting switches each of which is coupled to said disconnecting switch.

4. A gas insulated switchgear in accordance with claim 3, further comprising;
   a plurality of voltage transformers connected to a junction of two disconnecting switches.

* * * * *